(12) United States Patent
    Norburg

(10) Patent No.: US 10,212,881 B2
(45) Date of Patent: Feb. 26, 2019

(54) MODIFICATION TO THE GRAIN HARVESTING COMBINE

(71) Applicant: Steven Lee Norburg, Albany, IL (US)

(72) Inventor: Steven Lee Norburg, Albany, IL (US)

(73) Assignee: Steven Lee Norburg, Albany, IL (US)

( * ) Notice: Subject to any disclaimer, the term of this patent is extended or adjusted under 35 U.S.C. 154(b) by 90 days.

(21) Appl. No.: 15/430,471

(22) Filed: Feb. 11, 2017

(65) Prior Publication Data

US 2018/0228090 A1    Aug. 16, 2018

(51) Int. Cl.
    *A01D 41/12*    (2006.01)
    *A01F 12/60*    (2006.01)
    *A01F 12/44*    (2006.01)
    *A01F 12/46*    (2006.01)

(52) U.S. Cl.
    CPC ........ *A01D 41/1208* (2013.01); *A01F 12/444* (2013.01); *A01F 12/446* (2013.01); *A01F 12/46* (2013.01); *A01F 12/60* (2013.01)

(58) Field of Classification Search
    CPC ..... A01D 41/1208; A01D 12/60; A01F 12/32; A01F 12/446
    See application file for complete search history.

(56) References Cited

U.S. PATENT DOCUMENTS

| | | | | |
|---|---|---|---|---|
| 316,587 A | * | 4/1885 | Walker | A01D 41/1208 460/119 |
| 1,063,227 A | * | 6/1913 | Thompson | A01D 41/1208 460/119 |
| 2,540,249 A | * | 2/1951 | Evers | A01D 41/1208 56/473.5 |
| 3,193,995 A | * | 7/1965 | Miller | A01D 41/14 460/76 |
| 3,439,683 A | * | 4/1969 | Keller | A01F 7/06 460/119 |
| 3,529,408 A | * | 9/1970 | Keller | A01D 41/1208 414/334 |
| 4,060,960 A | * | 12/1977 | Hengen | A01D 41/02 56/14.6 |
| 9,033,643 B1 | * | 5/2015 | Kile | B60P 1/42 414/526 |
| 2017/0188514 A1 | * | 7/2017 | Ueda | A01F 12/60 |

FOREIGN PATENT DOCUMENTS

| | | | |
|---|---|---|---|
| JP | 2009039115 A | * | 2/2009 |
| JP | 2011046320 A | * | 3/2011 |
| JP | 2013048565 A | * | 3/2013 |
| JP | 2013132232 A | * | 7/2013 |

\* cited by examiner

*Primary Examiner* — Daniel J Colilla

(57) ABSTRACT

An improved self-propelled grain harvester and threshing machine characterized by the sieves, cleaning fan and grain tank being beneath the grain harvester's threshing system which puts the center of gravity in the bottom of the machine and eliminates the need for conveying the grain throughout the machine for cleaning and to the top of the machine for storage. This configuration eliminates several clean grain conveying systems and reduces the length of the reprocess tailings elevator giving the machine a safe low profile and center of gravity when the machine is empty and the center of gravity lowers as the grain tank fills.

1 Claim, 3 Drawing Sheets

DESIGN MODIFICATION

DESIGN MODIFICATION

VIEW AA

MODIFICATION TO THE GRAIN HARVESTING COMBINE

BRIEF DESCRIPTION OF THE DRAWINGS

An improved self-propelled grain harvester and threshing machine characterized by the sieves, cleaning fan and grain tank being beneath the grain harvester's threshing system which puts the center of gravity in the bottom of the machine and eliminates the need for conveying the grain throughout the machine for cleaning and to the top of the machine for storage. This configuration eliminates several clean grain conveying systems and reduces the length of the reprocess tailings elevator giving the machine a safe low profile and center of gravity when the machine is empty and the center of gravity lowers as the grain tank fills.

DETAILED DESCRIPTION OF THE INVENTION

Figure 1:
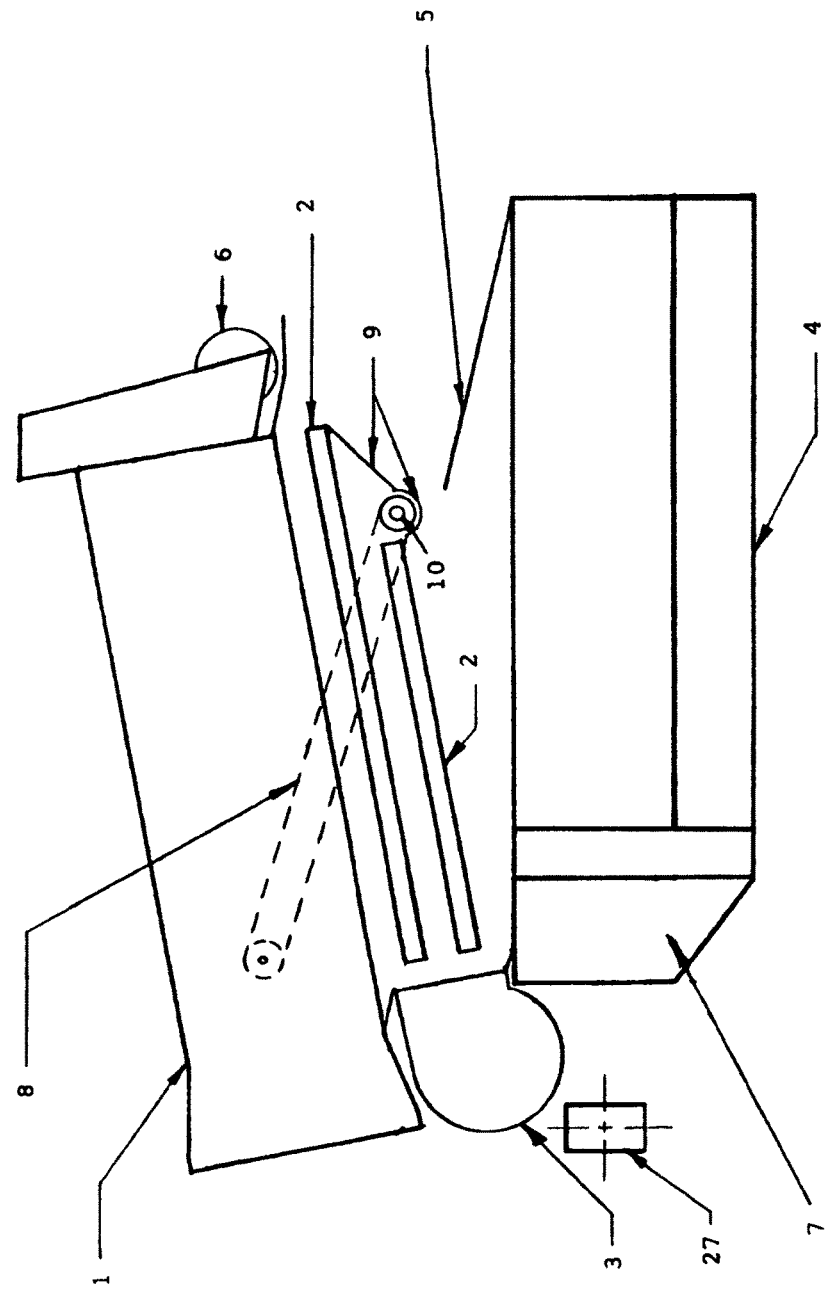
FIG. 1 is a side view of a Design Modification to the Grain Harvesting and Threshing Combine Machine showing my new design.

Referring to FIG. 1, the arrangement consists of a grain harvesting and threshing machine's threshing unit 1 that processes the grain that is delivered to it. The grain falls from the threshing unit 1 onto the sieves 2 while air from the cleaning fan 3 blows air upward and towards the back of the machine further removing chaff from the grain. The grain drops into the grain tank 4 and the chaff blows out of the back of the machine. So the cleaning fan 3 doesn't have to run at a higher than usual RPM to get the chaff far enough back to exit the machine, a deflector plate 5 covers part of the rear portion of the grain tank 4. Chaff only has to reach this point in it's backward travel and then the downward slope of the deflector plate 5 directs the chaff from entering the grain tank 4. With regard to this type of threshing system, the positive discharge beater 6 propels straw rearward toward the spreaders which are not shown since they are not part of what is being changed. The grain tank cutout 7 is space for the front drive wheels to be inset so the outside edge of the drive wheels are approximately even with the outside edge of the grain tank 4. Since this design puts the sieves 2 closer to the grain thresher 1, it allows the tailings elevator 8 to be reduced to approximately one-half of the usual length used on the existing types on rotary, hybrid and conventional type threshing system combines. The sieves 2 run the entire length of the threshing system 1 which provides efficiency by reducing grain loss. Grain pan 9 has a formed trough at the bottom of it for the tailings auger 10 to sit in. Grain falls onto grain pan 9, is directed to the tailings auger 10 and augured to the tailings elevator 8 for conveying to the threshing unit 1 for reprocessing. Front axle 27 gives a general reference to the components of this design modification.

Figure 2D:
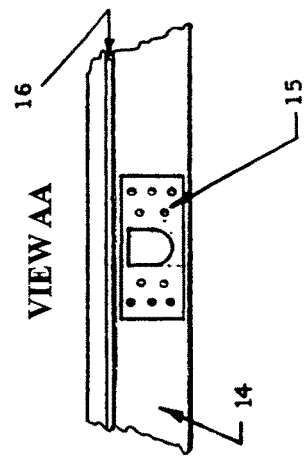
FIG. 2 is a top, side and rear view of the grain tank thereof.
Figure 2C:
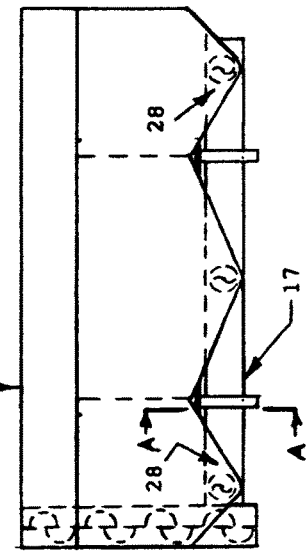
Figure 2A:
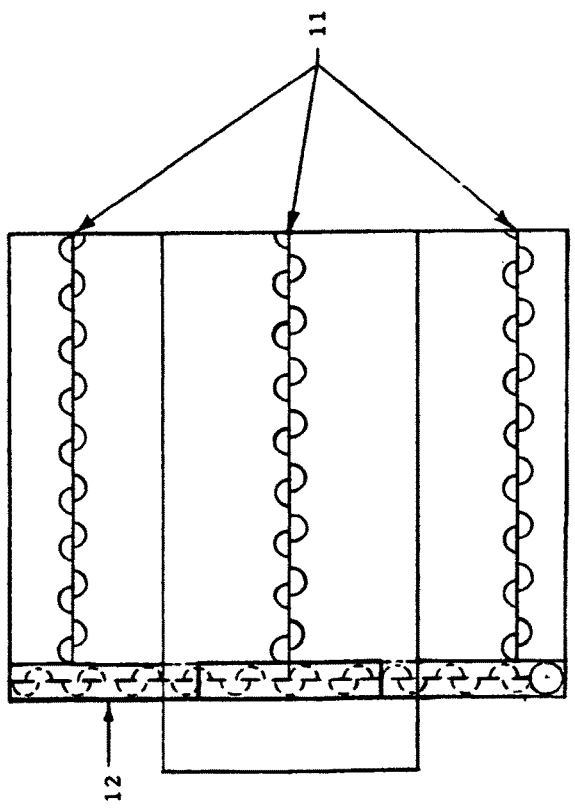
Figure 2B:
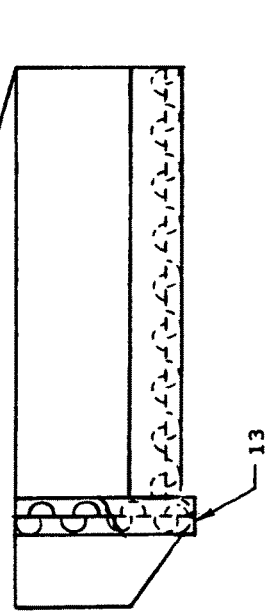

Referring to FIG. 2A, FIG. 2B and FIG. 2C, shows that the design of the grain tank 4 evenly distributes grain in the grain tank 4 and provides the outer valleys 28 to be filled, creating an even distribution of weight. The height of the grain tank 4 is shorter than the grain tanks used on existing machine grain tanks, however, the capacity is easily equaled because the grain tank 4 is longer than existing models. When the grain tank 4 is unloaded, the grain tank delivery auger 11 delivers grain from the rear of the machine forward to the transfer auger 12 delivers grain from one side of the grain tank 4. The transfer auger 12 delivers grain to the unloaded tube delivery tube auger 13 which delivers grain to the unloaded tube 18 in FIG. 3.

Referring to FIG. 2D, shows a cutout section VIEW AA referenced in FIG. 2C, of one of the main channel struts 14 that allows the transfer auger and trough 12 to run through it. The trough piece flat stock 15 shown in VIEW AA is welded and bolted to both sides of the main frame struts 14, while allowing the transfer auger and trough 12 at the bottom of the grain tank 4 to sit lower in the machine. This in turn allows the grain tank 4 to sit lower in the machine which is a major part of the design change since adequate space between the bottom of the threshing unit and the ground has to be allowed for, to keep the center of gravity to the bottom of the machine. The grain tank 4 support flat stock 16 is welded to the top of the main frame channel struts 14. This flat stock 16 gives support area for the grain tank 4 to sit on. The transfer trough 17 is shown in position running through the main frame struts 14.

Figure 3:
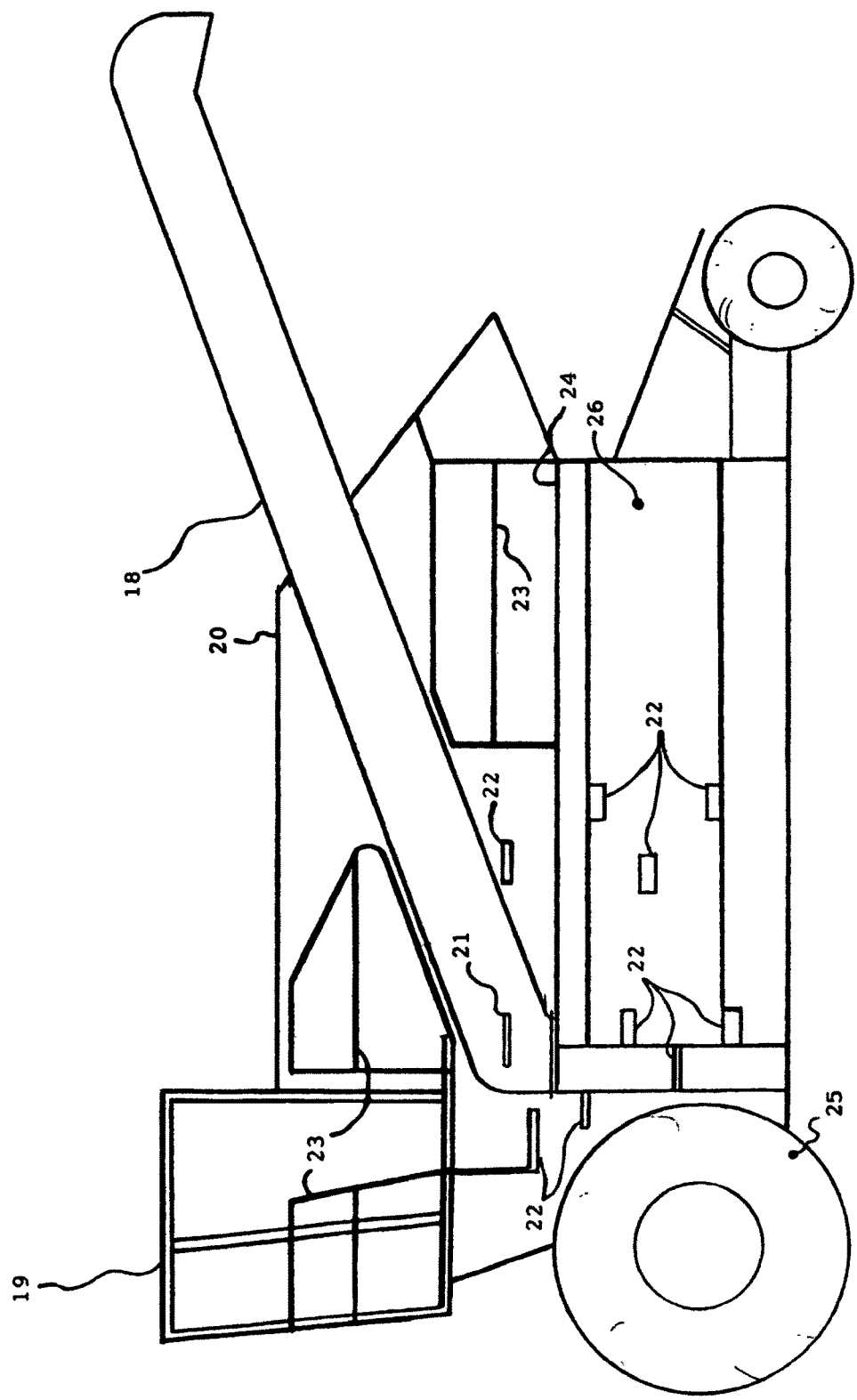
FIG. 3 is a side view of how the total configuration appears thereof.

Referring to FIG. 3, shows the unloaded tube 18 that angles upward from the front of the machine to the back of the machine and swings out away from the machine. Although the unloaded tube 18 attaches lower to the machine than on most combines, it is angled so that the point on the unloaded tube 18 that reaches the receptacle utility clears the edge of the receptacle utility. This allows the remaining length of the unloaded tube 18 to reach above and to the center of the receptacle utility. Extensions can easily be added for reach. With the unloaded tube 18 swung slightly to the right, a walkway 24 along the top of the grain tank 4 is provided. A walkway along the left side of the grain tank 4 is provided obstruction free. This provides a means of easy access to the engine compartment by allowing travel from the operator's cab 19 to the engine compartment 20 without climbing down from the operator's cab 19, and going to another access point on the machine to the engine compartment 20. Hand holds 21, and foot holds 22 and hand rails 23 allows access to the operator's cab 19 and safe travel from the operator's cab 19 to the engine compartment 20. The hand holds 21 and the foot holds 22 eliminate the need of having a separate access ladder installed to the right of the drive 25. This makes the width of the machine narrower and is one less obstacle that the operator has to contend with. Grain tank side sheet 26 is to be hinged to allow grain tank 4 to allow grain tank 4 access from the side of the machine.

I claim:

1. A grain harvesting and threshing combine machine comprising:
    a threshing unit;
    at least one sieve positioned directly below the threshing unit;
    a tailings elevator;
    a cleaning fan;
    a grain tank positioned directly below the at least one sieve; and
    a deflector plate covering an open portion of the grain tank;
    wherein the at least one sieve substantially covers a remaining open portion of the grain tank; the tailings elevator conveys tailings from the at least one sieve back to the threshing unit; and the cleaning fan blows air across the at least one sieve, upward and towards the back of the machine thereby further removing chaff from the grain.

\* \* \* \* \*